(12) United States Patent
Zhang et al.

(10) Patent No.: US 12,296,284 B2
(45) Date of Patent: *May 13, 2025

(54) ALTERNATING CASCADED SYSTEM FOR HIGH-SALINITY WASTEWATER TREATMENT

(71) Applicant: TONGJI UNIVERSITY, Shanghai (CN)

(72) Inventors: Yalei Zhang, Shanghai (CN); Xuefei Zhou, Shanghai (CN); Lei Wang, Shanghai (CN); Yinchuan Yang, Shanghai (CN); Jiabin Chen, Shanghai (CN); Xinmiao Zhang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 581 days.

This patent is subject to a terminal disclaimer.

(21) Appl. No.: 17/511,295

(22) Filed: Oct. 26, 2021

(65) Prior Publication Data

US 2022/0410034 A1 Dec. 29, 2022

(30) Foreign Application Priority Data

Jun. 28, 2021 (CN) .......................... 202110718089.5

(51) Int. Cl.
| | |
|---|---|
| *B01D 15/22* | (2006.01) |
| *B01D 15/20* | (2006.01) |
| *B01D 29/03* | (2006.01) |
| *C02F 1/00* | (2023.01) |
| *C02F 1/28* | (2023.01) |

(52) U.S. Cl.
CPC .......... *B01D 15/22* (2013.01); *B01D 15/203* (2013.01); *B01D 29/03* (2013.01); *C02F 1/004* (2013.01);

(Continued)

(58) Field of Classification Search
CPC ...... B01D 15/22; B01D 15/203; B01D 29/03; B01D 2201/167; B01D 2201/184;
(Continued)

(56) References Cited

U.S. PATENT DOCUMENTS 5,736,059 A * 4/1998 Mackelvie ............ F24D 17/001
165/47
11,485,651 B1 * 11/2022 Zhang .................... B01D 15/02
(Continued)

FOREIGN PATENT DOCUMENTS

| CN | 109914566 A | * | 6/2019 |
| CN | 110002525 A | * | 7/2019 |
| CN | 110790455 A | * | 2/2020 |

OTHER PUBLICATIONS

ABG, Geotextile Filtration, 2020 (Year: 2020).*
(Continued)

*Primary Examiner* — Robert J Popovics
(74) *Attorney, Agent, or Firm* — troutman pepper locke; Tim Tingkang Xia, Esq.

(57) ABSTRACT

An alternating cascaded system for high-salinity wastewater treatment includes a pollutant removal system and an alternating cascaded water conveyance system embedded in the pollutant removal system. The pollutant removal system includes four partition plates, a pollutant removal zone and a discharge sump; and the alternating cascaded water conveyance system includes feed water distribution channels disposed under a feed water conveyer pipe and on an outer wall of a first pollutant removal subzone, cleaning water distribution channels disposed on an outer wall of a third pollutant removal subzone and located under a cleaning water pipe, and a purified water discharge pipe and a cleaning water discharge pipe that are located in the discharge sump and axially have a same discharge direction from top to bottom.

10 Claims, 6 Drawing Sheets

(52) U.S. Cl.
CPC ........ *C02F 1/285* (2013.01); *B01D 2201/167* (2013.01); *B01D 2201/184* (2013.01); *C02F 2201/003* (2013.01); *C02F 2201/005* (2013.01); *C02F 2303/16* (2013.01)

(58) Field of Classification Search
CPC .... C02F 1/004; C02F 1/285; C02F 2201/003; C02F 2201/005; C02F 2303/16; C02F 2101/20; C02F 2301/026; C02F 1/006; C02F 2103/08; C02F 1/28; C02F 2303/14
See application file for complete search history.

(56) References Cited

U.S. PATENT DOCUMENTS

| | | | | |
|---|---|---|---|---|
| 2010/0096310 | A1* | 4/2010 | Yoshida | B01D 29/35 210/151 |
| 2011/0068058 | A1* | 3/2011 | Sun | B01D 61/18 210/206 |
| 2016/0067636 | A1* | 3/2016 | Lee | C02F 1/004 210/741 |
| 2017/0051717 | A1* | 2/2017 | Kim | H02K 7/1823 |
| 2018/0105617 | A1* | 4/2018 | Fan | C08G 63/06 |
| 2021/0139349 | A1* | 5/2021 | Pohjola | F16K 15/063 |
| 2021/0187420 | A1* | 6/2021 | Sergerie | B01D 33/06 |
| 2022/0119599 | A1* | 4/2022 | Zhang | C01G 49/08 |
| 2022/0410034 | A1* | 12/2022 | Zhang | B01D 15/22 |
| 2022/0411286 | A1* | 12/2022 | Zhang | B01D 15/14 |

OTHER PUBLICATIONS

Cui, CN 109914566 A, English machine translation (Year: 2019).*
Hou, CN110002525 A, English machine translation (Year: 2019).*
Chen, CN110790455 A, English machine translation (Year: 2020).*

* cited by examiner

ALTERNATING CASCADED SYSTEM FOR HIGH-SALINITY WASTEWATER TREATMENT

CROSS REFERENCE TO THE RELATED APPLICATIONS

This application is based upon and claims priority to Chinese Patent Application No. 202110718089.5, filed on Jun. 28, 2021, the entire contents of which are incorporated herein by reference.

TECHNICAL FIELD

The present disclosure belongs to the technical field of environmental engineering, and more particularly, relates to an alternating cascaded system for high-salinity wastewater treatment.

BACKGROUND

As the chief component of industrial production wastewater, high-salinity wastewater has become a major environmental issue for industrial development and wastewater treatment due to its large discharge amount and complex treatment.

Any discharge of high-salinity wastewater not in compliance with the required standard will not only waste salt and water resources, but will also pollute the environment substantially. As an important environmental factor in the water environment, salinity directly or indirectly affects the growth and reproduction of aquatic organisms. Thus, a sharp increase in the salinity of the water environment will disturb the osmotic balance between the aquatic species and their living environment, which causes cell dehydration and decreased turgor pressure, leading to plasmolysis and metabolic disorder or even death. Additionally, the salt content in the soil nearby also increases and causes degeneration of the soil structure, thereby affecting the soil ecosystem. Hence, the efficient treatment of high-salinity wastewater and the recycling of inorganic salts and water resources therefrom have important implications for resolving resource shortages and environmental pollution.

Due to its complex compositions and large concentrations, high-salinity wastewater can easily lead to an interruption of the treatment process and abnormal operation of the treatment equipment. In this regard, a pretreatment process must be involved prior to the formal process to reduce the concentration of some pollutants and treat them harmlessly. In the prior art, there are mainly a biological method, a chemical method and a physical method. The biological method is to treat the wastewater by using the metabolism and reproduction of microbes themselves. However, heavy metals and other substances in the high-salinity wastewater will destroy enzyme structures of the microbes, inhibit their growth and reproduction, or even lead to cell inactivation. The chemical method is to treat the wastewater by using chemical agents, but this method has a high cost and will cause additional pollution. The physical method is to separate some pollutants from the wastewater system through physical means such as adsorption, flocculation and coagulation. This method is more practicable than the previous two methods but still has the following problems to be solved: (1) In the prior art, since desorption or backwashing is required after adsorption or filtration, only intermittent operation is allowed in this case, where a plurality of parallel processes are typically adopted for alternate operation, which is essentially the intermittent operation, and the initial investment and the operation cost are increased as a result. (2) The large mass of the adsorbent increases the total weight of the equipment, thereby increasing the operation cost such as the power consumption. (3) The adsorbing effect of the existing adsorbent is undesirable. As a novel light material, the hydrogel has an excellent adsorbing effect for the pollutants, but its use in the related field of high-salinity wastewater treatment remains absent.

It is, therefore, highly desirable to develop a treatment process that can treat high-salinity wastewater efficiently by using the hydrogel and can maintain continuous operation, which has important implications for existing environmental protection and eco-environmental protection.

SUMMARY

In view of the above defects, the present disclosure provides an alternating cascaded system for high-salinity wastewater treatment, which implements multipoint feed with cascade water distribution, improves the uniformity of the water distribution, and can greatly improve the treatment effect of the system.

The present disclosure provides the following technical solutions: An alternating cascaded system for high-salinity wastewater treatment includes a pollutant removal system and an alternating cascaded water conveyance system embedded in the pollutant removal system, where the pollutant removal system includes four partition plates, a hollow cylindrical pollutant removal zone, a cylindrical discharge sump located in an axial center of the pollutant removal zone, a rotating shaft fixedly connected to the four partition plates, a motor for driving the rotating shaft to rotate, and a fixed support fixedly connected to the motor and configured to support the system;

the four partition plates are uniformly distributed in the pollutant removal zone of the pollutant removal system, to axially and uniformly partition the pollutant removal zone into four sector-shaped pollutant removal subzones: a first pollutant removal subzone, a second pollutant removal subzone, a third pollutant removal subzone and a fourth pollutant removal subzone; and a hydrogel material having a purification effect is filled in each of the four pollutant removal subzones;

the pollutant removal zone, the discharge sump and the rotating shaft are coaxial to share a common central axis perpendicular to the ground;

the alternating cascaded water conveyance system includes a feed water conveyer pipe, a feed valve connected to the feed water conveyer pipe, feed water distribution channels disposed on an outer wall of the first pollutant removal subzone and located under the feed water conveyer pipe, a cleaning water pipe, a cleaning water valve connected to the cleaning water pipe, and cleaning water distribution channels disposed on an outer wall of the third pollutant removal subzone and located under the cleaning water pipe; and the alternating cascaded water conveyance system further includes a purified water discharge pipe and a cleaning water discharge pipe that are located in the discharge sump and axially have a same discharge direction from top to bottom;

a discharge pipe partition plate separates the purified water discharge pipe from the cleaning water discharge pipe in the discharge sump; and both the purified water discharge pipe and the cleaning water discharge pipe are tangent to an inner wall of the discharge sump; and the purified water discharge pipe is axially provided with a row of purified water discharge holes sequentially arranged and facing outward, and the cleaning water discharge pipe is axially provided with a row of cleaning water discharge holes sequentially arranged and facing outward, wherein the purified water discharge holes face the first pollutant removal subzone, and the cleaning water discharge holes face the third pollutant removal subzone.

Further, the feed water distribution channels may be disposed layer by layer, and may include a first-stage feed water distribution channel, a second-stage feed water distribution channel, a third-stage feed water distribution channel and a fourth-stage feed water distribution channel that are sequentially disposed layer by layer from top to bottom, and a feed water distribution hole may be provided at a junction between each feed water distribution channel and the system.

Further, the cleaning water distribution channels may be disposed layer by layer, and the cleaning water distribution channels may include a first-stage cleaning water distribution channel, a second-stage cleaning water distribution channel, a third-stage cleaning water distribution channel and a fourth-stage cleaning water distribution channel that are sequentially disposed layer by layer from top to bottom, and a cleaning water distribution hole may be provided at a junction between each cleaning water distribution channel and the system.

Further, the discharge sump may have a diameter of 110-280 mm; the discharge sump may include a housing and at least one row of water distribution holes that are sequentially arranged on a surface of the housing, face two sides vertically in an axial direction, and face the first pollutant removal subzone; and circle centers of the purified water discharge holes and circle centers of the water distribution holes of the discharge sump may be in a one-to-one correspondence in the first pollutant removal subzone; and a filter screen may be provided on a contact surface between the sector-shaped pollutant removal subzone and the discharge sump, and a hole diameter of the filter screen may be 25-55% of a diameter of the water distribution hole of the discharge sump.

Further, a diameter of the purified water discharge hole may be 110-115% of a diameter of the corresponding water distribution hole of the discharge sump; and the diameter of the purified water discharge hole may be 3-8 mm.

Further, a feed check valve may be disposed on the feed water conveyer pipe; a diameter of the feed water conveyer pipe may be 20-45% of the diameter of the discharge sump; purified water discharge baffles may be disposed on the purified water discharge pipe; and the purified water discharge baffles may be distributed on a wall of the purified water discharge pipe, such that water flowing out from the pollutant removal zone enters the purified water discharge pipe rather than flowing into the discharge sump.

Further, four rows of water distribution holes may be axially and sequentially arranged on the surface of the housing of the discharge sump, and the four rows of water distribution holes may be circumferentially and uniformly distributed along cross sections of the discharge sump.

Further, a cleaning water check valve for controlling whether the cleaning water pipe feeds water may be disposed on the cleaning water pipe, and a diameter of the cleaning water pipe may be equal to the diameter of the feed water conveyer pipe.

Further, cleaning water discharge baffles may be disposed on the cleaning water discharge pipe; and the cleaning water discharge baffles may be distributed on a wall of the cleaning water discharge pipe, such that the water flowing out from the pollutant removal zone enters the cleaning water discharge pipe rather than flowing into the discharge sump.

Further, a hydrogel filler in the pollutant removal subzone may have a thickness of 500-1,000 mm, and the internal hydrogel material may have a filling rate of 70-85%; the partition plate and the discharge sump may be welded and treated to be waterproof; the partition plate may be made of a stainless steel material; and the housing of the discharge sump may be cylindrical, may have a diameter of 180-2,000 mm, and may be made of stainless steel.

The present disclosure has the following beneficial effects.

1. The present disclosure implements the independent operation of each independent purification subzone innovatively with the special structure and has the strong controllability, thereby reducing the complexity in treatment and reducing the operation cost and the manpower.
2. The present disclosure implements the synchronous water feed and discharge innovatively with the alternating cascaded water conveyance system, thereby achieving the unintermittent operation of the system and the continuous treatment on the high-salinity wastewater; and the present disclosure has the desirable engineering application prospect.
3. The present disclosure implements multipoint feed innovatively with cascade water distribution, improves the uniformity of water distribution, and can greatly improve the treatment effect of the system.
4. The present disclosure treats the high-salinity wastewater innovatively with the hydrogel, and fully exerts its advantages of the large adsorption amount, light weight and so on, thereby effectively accelerating the treatment effect on the high-salinity wastewater, and reducing the operation cost.
5. The present disclosure implements the periodic and sequential operation of each purification unit innovatively, and can clean the filler conveniently by turning over and cleaning the filler, which greatly improves the service life of the system.
6. The present disclosure has the desirable compatibility and adjustable length-to-width ratio, and can be mounted in parallel or series according to site conditions. With low limitations on the site, the present disclosure gains massive popularization and application.
7. With regard to market development, as the high-salinity wastewater is the major environmental issue for industrial development and wastewater treatment, its treatment has important social, environmental and ecological significances and the broad market prospect. The present disclosure is essential and desirable for the eco-environmental treatment as the novel technique in the high-salinity wastewater treatment.
8. With regard to engineering construction, the alternating cascaded treatment method for the high-salinity wastewater provided by the present disclosure has the strong adaptability, and can be applied to different types of high-salinity wastewater. Further, the method can be applied to upgrade and reconstruction of existing industrial parks to avoid the environmental pollution caused by the illegal discharge of the high-salinity wastewater, and has the desirable engineering application value.
9. With regard to professional development, since the high-salinity wastewater treatment is the hotspot and difficulty in water treatment, the present disclosure solves the technical problems with novel materials and novel processes, and can effectively make up the blank of the professional skills in the related art, thereby greatly promoting the processional development.

BRIEF DESCRIPTION OF THE DRAWINGS

The present disclosure will be described below in more detail with reference to the examples and the accompanying drawings.

In the figures:
1—pollutant removal system, 11—partition plate, 12—pollutant removal zone, 121—first pollutant removal subzone, 122—second pollutant removal subzone, 123—third pollutant removal subzone, 124—fourth pollutant removal subzone, 13—discharge sump, 131—housing of the discharge sump, 132—water distribution hole of the discharge sump, 14—rotating shaft, 15—fixed support, and 17—filter screen; and 2—alternating cascaded water conveyance system, 20—feed water conveyer pipe, 201—feed valve, 21—feed water distribution channel, 211—first-stage feed water distribution channel, 212—second-stage feed water distribution channel, 213—third-stage feed water distribution channel, 214—fourth-stage feed water distribution channel, 215—feed water distribution hole, 22—cleaning water pipe, 221—cleaning water valve, 23—cleaning water distribution channel, 231—first-stage cleaning water distribution channel, 232—second-stage cleaning water distribution channel, 233—third-stage cleaning water distribution channel, 234—fourth-stage cleaning water distribution channel, 235—cleaning water distribution hole, 24—purified water discharge pipe, 241—purified water discharge hole, 242—purified water discharge baffle, 25—cleaning water discharge pipe, 251—cleaning water discharge hole, 252—cleaning water discharge baffle, and 26—discharge pipe partition plate.

DETAILED DESCRIPTION OF THE EMBODIMENTS

The technical solutions of the embodiments of the present disclosure are clearly and completely described below with reference to the accompanying drawings. Apparently, the described examples are merely a part rather than all of the examples of the present disclosure. All other examples obtained by a person of ordinary skill in the art based on the examples of the present disclosure without creative efforts shall fall within the protection scope of the present disclosure.

Example 1

Figure 1:
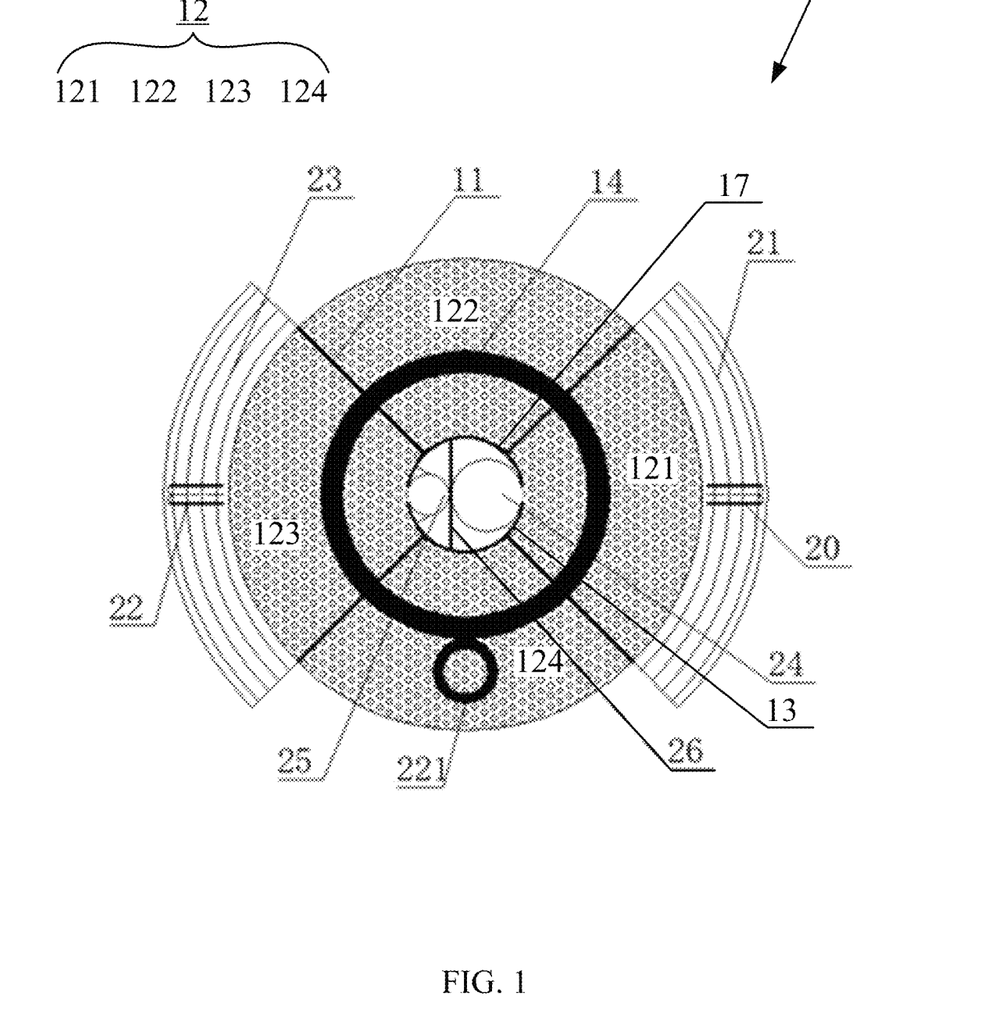
FIG. 1 is a front view of an alternating cascaded system for high-salinity wastewater treatment provided by the present disclosure.
Figure 2:
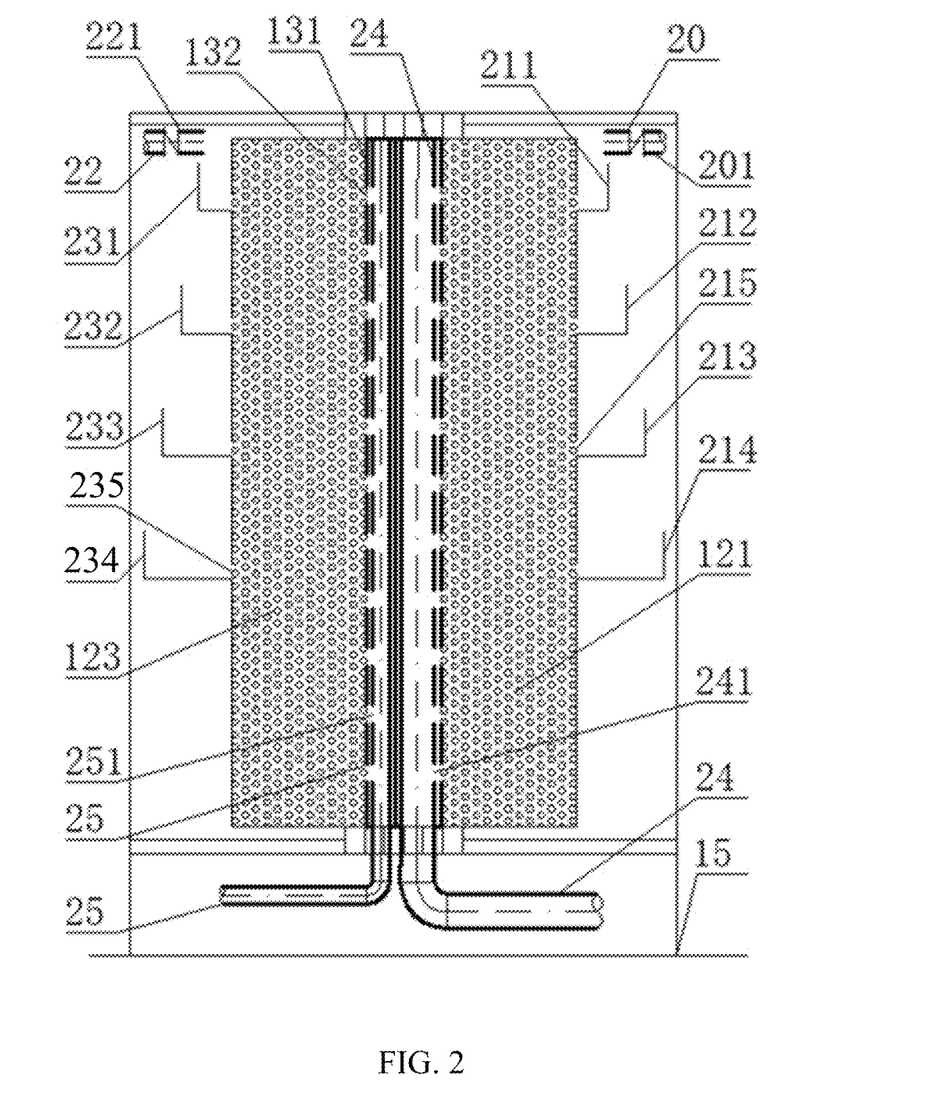
FIG. 2 is a side view of an alternating cascaded system for high-salinity wastewater treatment provided by the present disclosure.

As shown in FIG. 1, an alternating cascaded system for high-salinity wastewater treatment is provided. In the present disclosure, the high-salinity wastewater refers to the wastewater with a total salt content of 1-5% by mass percent. As shown in FIGS. 1-2, the system includes a pollutant removal system 1 and an alternating cascaded water conveyance system 2 embedded in the pollutant removal system 1.

The pollutant removal system 1 includes four partition plates 11, a hollow cylindrical pollutant removal zone 12, a cylindrical discharge sump 13 located in an axial center of the pollutant removal zone 12, a rotating shaft 14 fixedly connected to the four partition plates 11, a motor (not shown) for driving the rotating shaft 14 to rotate, and a fixed support 15 fixedly connected to the motor (not shown) and configured to support the system.

The four partition plates 11 are uniformly distributed in the pollutant removal zone 12 of the pollutant removal system 1, to axially and uniformly partition the pollutant removal zone 12 into four sector-shaped pollutant removal subzones: a first pollutant removal subzone 121, a second pollutant removal subzone 122, a third pollutant removal subzone 123 and a fourth pollutant removal subzone 124; and a hydrogel material having a purification effect is filled in each of the four pollutant removal subzones.

The pollutant removal zone 12, the discharge sump 13 and the rotating shaft 14 are coaxial to share a common central axis perpendicular to the ground.

Figure 3:
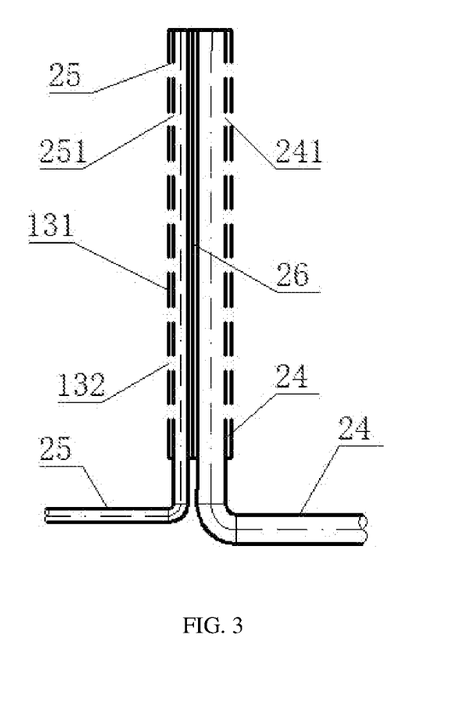
FIG. 3 is a detailed view of a discharge pipe in an alternating cascaded water conveyance system in an alternating cascaded system for high-salinity wastewater treatment provided by the present disclosure.

As shown in FIGS. 2-3, the alternating cascaded water conveyance system 2 includes a feed water conveyer pipe 20, a feed valve 201 connected to the feed water conveyer pipe 20, feed water distribution channels 21 disposed on an outer wall of the first pollutant removal subzone 121 and located under the feed water conveyer pipe 20, a cleaning water pipe 22, a cleaning water valve 221 connected to the cleaning water pipe 22, and cleaning water distribution channels 23 disposed on an outer wall of the third pollutant removal subzone 123 and located under the cleaning water pipe 22; the feed water distribution channels 21 are disposed layer by layer, and include a first-stage feed water distribution channel 211, a second-stage feed water distribution channel 212, a third-stage feed water distribution channel 213 and a fourth-stage feed water distribution channel 214 that are sequentially disposed layer by layer from top to bottom; a feed water distribution hole 215 is provided at a junction between each feed water distribution channel and the system; the cleaning water distribution channels 23 are disposed layer by layer; the cleaning water distribution channels 23 include a first-stage cleaning water distribution channel 231, a second-stage cleaning water distribution channel 232, a third-stage cleaning water distribution channel 233 and a fourth-stage cleaning water distribution channel 234 that are sequentially disposed layer by layer from top to bottom; and a cleaning water distribution hole 235 is provided at a junction between each cleaning water distribution channel and the system.

The alternating cascaded water conveyance system 2 further includes a purified water discharge pipe 24 and a cleaning water discharge pipe 25 that are located in the discharge sump 13 and axially have a same discharge direction from top to bottom.

A discharge pipe partition plate 26 separates the purified water discharge pipe 24 from the cleaning water discharge pipe 25 in the discharge sump 13; and both the purified water discharge pipe 24 and the cleaning water discharge pipe 25 are tangent to an inner wall of the discharge sump 13.

The purified water discharge pipe 24 is axially provided with a row of purified water discharge holes 241 sequentially arranged and facing outward, and the cleaning water discharge pipe 25 is axially provided with a row of cleaning water discharge holes 251 sequentially arranged and facing outward, wherein the purified water discharge holes 241 face the first pollutant removal subzone 121, and the cleaning water discharge holes 251 face the third pollutant removal subzone 123.

The discharge sump 13 has a diameter of 115 mm; as shown in FIG. 3, the discharge sump 13 includes a housing 131 and at least one row of water distribution holes 132 that are sequentially arranged on a surface of the housing 131, face two sides vertically in an axial direction, and face the first pollutant removal subzone 121; and circle centers of the purified water discharge holes 241 and circle centers of the water distribution holes 132 of the discharge sump are in a one-to-one correspondence in the first pollutant removal subzone 121.

A filter screen 17 is provided on a contact surface between the sector-shaped pollutant removal subzone and the discharge sump 13, and a hole diameter of the filter screen 17 is 26% of a diameter of the water distribution hole 132 of the discharge sump.

A diameter of the purified water discharge hole 241 is 112% of a diameter of a corresponding water distribution hole 132 of the discharge sump; and the diameter of the purified water discharge hole 241 is 3 mm.

As shown in FIG. 2, a feed check valve 201 is disposed on the feed water conveyer pipe 20; a diameter of the feed water conveyer pipe 20 is 20% of the diameter of the discharge sump 13; purified water discharge baffles 242 are disposed on the purified water discharge pipe 24; and the purified water discharge baffles 242 are distributed on a wall of the purified water discharge pipe 24, such that water flowing out from the pollutant removal zone 12 enters the purified water discharge pipe 24 rather than flowing into the discharge sump 13.

Preferably, four rows of water distribution holes 132 are axially and sequentially arranged on the surface of the housing 131 of the discharge sump, and the four rows of water distribution holes 132 are circumferentially and uniformly distributed along cross sections of the discharge sump 13.

As shown in FIG. 2, a cleaning water check valve 221 for controlling whether the cleaning water pipe 22 feeds water is disposed on the cleaning water pipe 22, and a diameter of the cleaning water pipe 22 is equal to the diameter of the feed water conveyer pipe 20.

Figure 4:
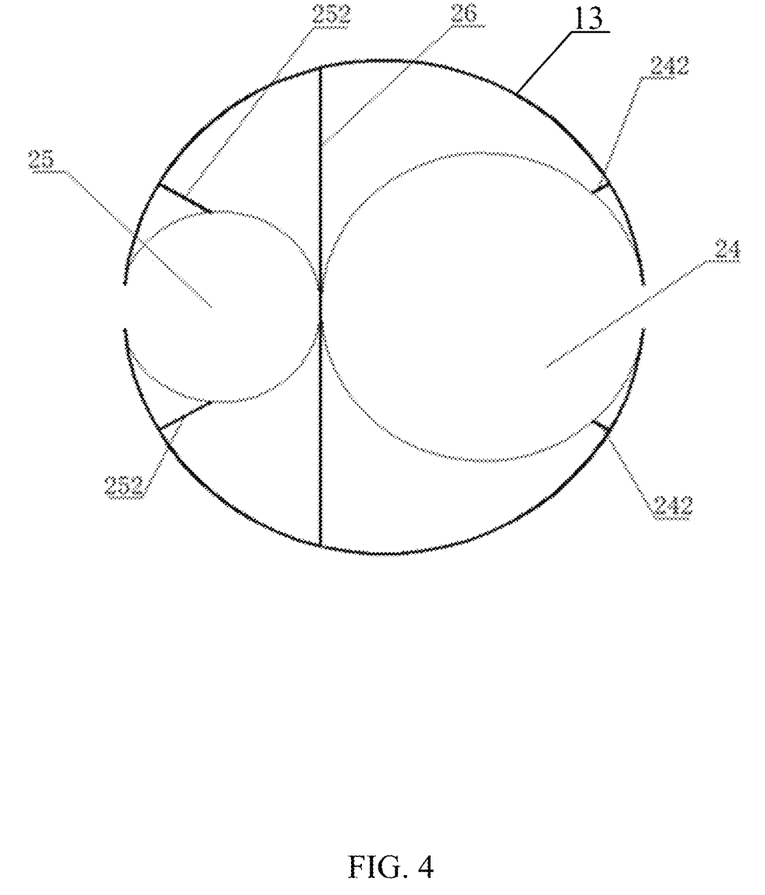
FIG. 4 is a side view of a purified water discharge pipe and a cleaning water discharge pipe in a system provided by the present disclosure.

As shown in FIG. 4, cleaning water discharge baffles 252 are disposed on the cleaning water discharge pipe 25; and the cleaning water discharge baffle 252 are distributed on a wall of the cleaning water discharge pipe 25, such that the water flowing out from the pollutant removal zone 12 enters the cleaning water discharge pipe 25 rather than flowing into the discharge sump 13.

A hydrogel filler in the pollutant removal subzone has a thickness of 550 mm, and the internal hydrogel material has a filling rate of 72%; the partition plate 11 and the discharge sump 13 are welded and treated to be waterproof; the partition plate 11 is made of a stainless steel material; and the housing 131 of the discharge sump 13 is cylindrical, has a diameter of 185 mm, and is made of stainless steel.

Figure 5:
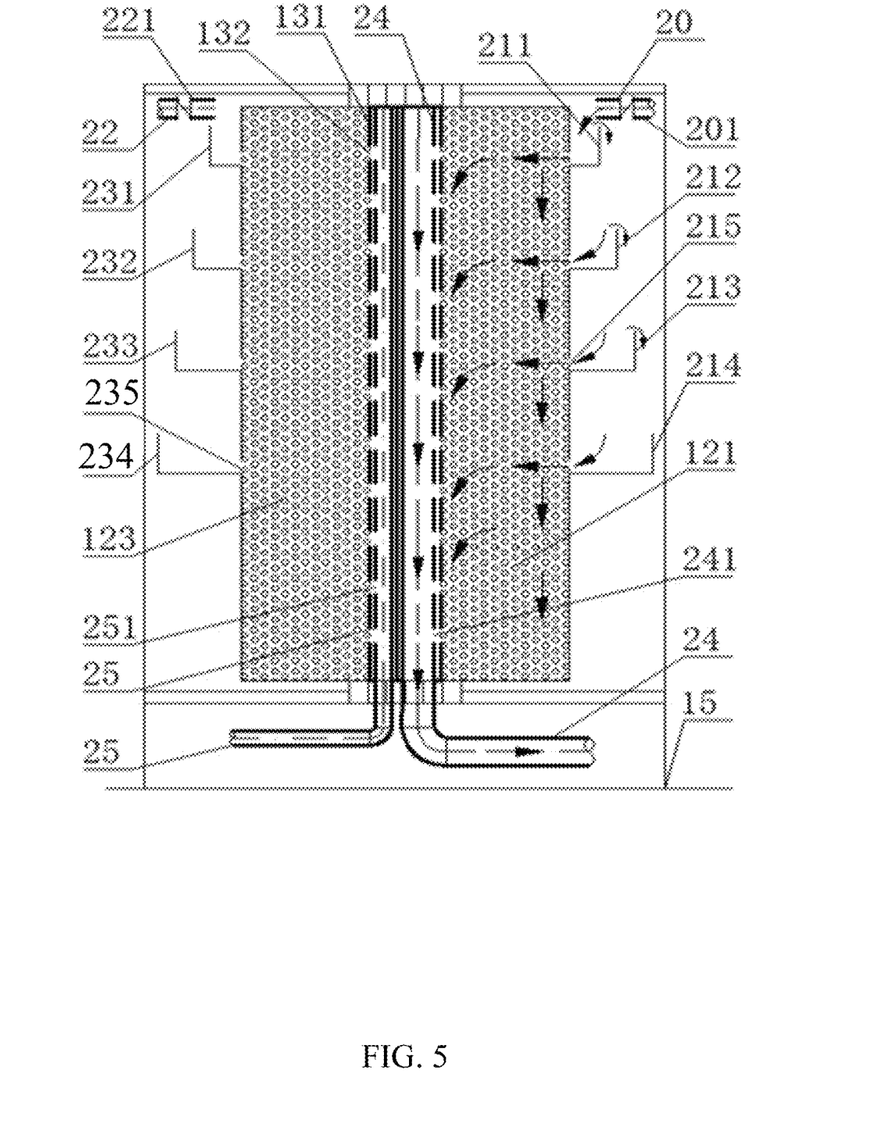
FIG. 5 is a front view of an alternating cascaded system for high-salinity wastewater treatment provided by the present disclosure in a state of Step S1 in operation.

The alternating cascaded system for high-salinity wastewater treatment provided by the present disclosure has the following working principles:

S1: The high-salinity wastewater enters the first-stage feed water distribution channel 211 through the feed water conveyer pipe 20 in the alternating cascaded water conveyance system 2, and sequentially enters each stage of feed water distribution channel till the fourth-stage feed water distribution channel 214; the high-salinity wastewater in the water distribution channel enters the pollutant removal system 1 through the feed water distribution hole 215 of each water distribution channel; and the system sets feed time as T. In this step, the feed water conveyer pipe 20 feeds water continuously.

The hydrogel filler for adsorbing the high-salinity wastewater for removal is filled in the pollutant removal system 1.

S2: The high-salinity wastewater enters the first pollutant removal subzone 121 in the pollutant removal system 1, reaches the purified water discharge pipe 24 through the purified water discharge hole 241 and flows out of the system. When the high-salinity wastewater flows through the pollutant removal subzone, pollutants are intercepted.

S3: The rotating shaft 14 in the pollutant removal system 1 is driven by the motor (not shown) to rotate, such that the first pollutant removal subzone 121 in the pollutant removal system rotates 90° to enter a position where the fourth pollutant removal subzone 124 or the second pollutant removal subzone 122 is located, and the second pollutant removal subzone 122 to the fourth pollutant removal subzone 124 rotate 90° at the same time.

S4: The high-salinity wastewater enters the first-stage feed water distribution channel 211 again through the feed water conveyer pipe 20 in the alternating cascaded water conveyance system 2, and sequentially enters each stage of feed water distribution channel till the fourth-stage feed water distribution channel 214; and the high-salinity wastewater in the water distribution channel enters the pollutant removal system 1 through the feed water distribution hole 215.

S5: After Step 3 is repeated twice, the first pollutant removal subzone 121 is located at a leftmost position; the system turns on the cleaning water valve 221, such that the cleaning water pipe 22 feeds water, and the cleaning water enters the first-stage cleaning water distribution channel 231 and sequentially enters each stage of cleaning water distribution channel till the fourth-stage cleaning water distribution channel 234; and the cleaning water in the water distribution channel enters the first pollutant removal subzone 121 through the cleaning water distribution hole 235, cleans the subzone and is discharged.

Specifically: S51: After Step 3 is repeated twice, the first pollutant removal subzone 121 in the pollutant removal system 1 uses the hydrogel filler therein to fully adsorb pollutants in the high-salinity wastewater for removal, the high-salinity wastewater in the first pollutant removal subzone 121 flows out from the purified water discharge pipe 24, and at this time, the first pollutant removal subzone 121 is located under the cleaning water pipe 22.

S52: The cleaning water pipe 22 starts to feed water, and fills the water into the first pollutant removal subzone 121 for cleaning. Upon the completion of cleaning, the cleaning water enters the cleaning water discharge pipe 25 through the cleaning water discharge hole 251 for discharge. The cleaning water pipe 22 is initially turned on within 2T after the feed water conveyer pipe 20 starts to feed the water, with the intermittent operation time being 0.5T.

Figure 6:
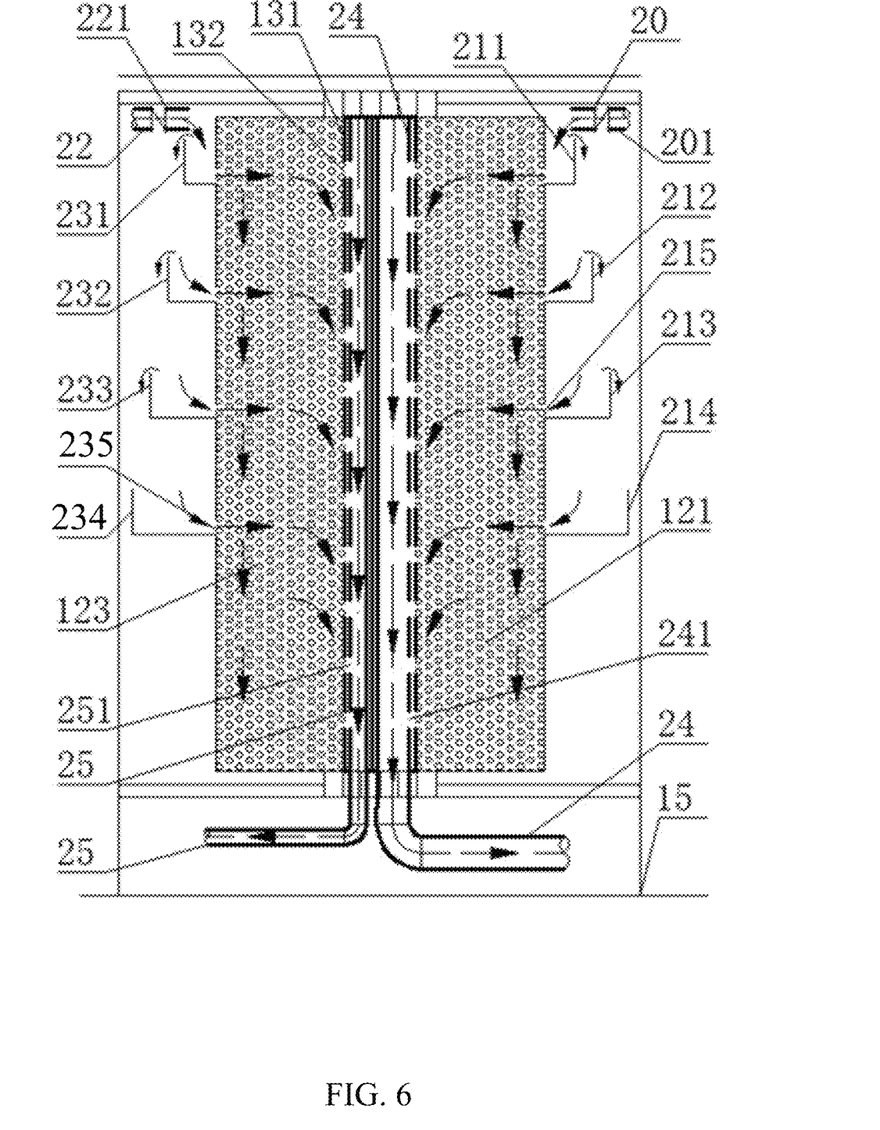
FIG. 6 is a front view of an alternating cascaded system for high-salinity wastewater treatment provided by the present disclosure in a state of Step S53 in operation.

S53: While the first pollutant removal subzone is cleaned, the third pollutant removal subzone 123 is located under the feed water conveyer pipe 20, and Step S2 is repeated.

S6: Steps S3-S5 are repeated to accomplish unintermittent removal of the pollutants in the high-salinity wastewater, i.e., after the first pollutant removal subzone 121 is cleaned completely, Step S3 is continuously repeated once and Steps S51-S53 are repeated once, thereby completing feeding of the high-salinity wastewater to a next pollutant removal subzone through the feed pipe 215 in the alternating cascaded water conveyance system 2, as well as wastewater discharging and cleaning of the cleaning water pipe 22 on the next pollutant removal subzone.

The rotating shaft 14 in the pollutant removal system 1 is driven by the motor (not shown) to rotate clockwise or counterclockwise.

The system provided by the present disclosure includes the pollutant removal system 1 and the alternating cascaded water conveyance system 2 nested therein. The hollow cylindrical pollutant removal zone is partitioned by the partition plate into four pollutant removal subzones, namely the first pollutant removal subzone 121 to the fourth pollutant removal subzone 124. Specifically, the partition plate 11, the filter screen 17 and the housing of the pollutant removal zone are jointly formed into an enclosed sector-shaped prism structure, and the pollutant removal subzone on each sector-shaped section is filled with the hydrogel material having the water purification effect.

The hollow portion in the pollutant removal system 1 is the discharge sump 13, is internally and tangentially provided with the purified water discharge pipe 24 and the cleaning water discharge pipe 25 axially having the same discharge direction from top to bottom, and separated left and right by the discharge pipe partition plate 26. Preferably, the diameter of the purified water discharge pipe 24 is more than that of the cleaning water discharge pipe 25.

The wastewater entering the system from the feed water conveyer pipe 20 enters the pollutant removal subzone of the system through the first-stage feed water distribution channel 211; and when overflowing from the first-stage feed water distribution channel 211, the high-salinity wastewater is sequentially and vertically downward to enter each stage of feed water distribution channel till the fourth-stage feed water distribution channel 214. With the same feed principle as the high-salinity wastewater, the cleaning water entering the system from the cleaning water discharge pipe 22 enters, through the first-stage feed water distribution channel 231, the pollutant removal subzone to be cleaned; and when overflowing from the first-stage feed water distribution channel 231, the cleaning water is sequentially and vertically downward to enter each stage of feed water distribution channel till the fourth-stage cleaning water distribution channel 234, thereby sequentially and continuously cleaning each pollutant removal subzone. Each pollutant removal subzone is fixedly connected to the discharge sump 13. The system periodically rotates 90° each time but the purified water discharge pipe 24 and the cleaning water discharge pipe 25 do not rotate therewith, thereby implementing continuous treatment on the wastewater and continuous cleaning on the system. The present disclosure can use the adsorbent repeatedly while treating the heavy metals in the high-salinity wastewater, and has the remarkable advantages of strong stability, simple maintenance, long service life, etc.

Example 2

The differences between the example and Example 1 lie in: In the alternating cascaded system for high-salinity wastewater treatment used by the example, the discharge sump 13 has the diameter of 280 mm, the hole diameter of the filter screen 17 is 55% of a diameter of the water distribution hole 132 of the discharge sump, and the diameter of the purified water discharge hole 241 is 115% of the diameter of the corresponding water distribution hole 132 of the discharge sump; and the diameter of the purified water discharge hole 241 is 7.8 mm, and the diameter of the feed water conveyer pipe 20 is 44.5% of the diameter of the discharge sump 13.

The hydrogel filler in the pollutant removal subzone has the thickness of 980 mm, and the internal hydrogel material has the filling rate of 84%; and the housing 131 of the discharge sump 13 is cylindrical, has the diameter of 2,000 mm, and is made of stainless steel.

Example 3

The differences between the example and Example 1 lie in: In the alternating cascaded system for high-salinity wastewater treatment used by the example, the discharge sump 13 has the diameter of 205 mm, the hole diameter of the filter screen 17 is 40% of a diameter of the water distribution hole 132 of the discharge sump, and the diameter of the purified water discharge hole 241 is 113% of the diameter of the corresponding water distribution hole 132 of the discharge sump; and the diameter of the purified water discharge hole 241 is 6 mm, and the diameter of the feed water conveyer pipe 20 is 34% of the diameter of the discharge sump 13.

The hydrogel filler in the pollutant removal subzone has the thickness of 750 mm, and the internal hydrogel material has the filling rate of 80%; and the housing 131 of the discharge sump 13 is cylindrical, has the diameter of 1050 mm, and is made of stainless steel.

All other embodiments obtained by those of ordinary skill in the art based on the embodiments of the present application without creative efforts should fall within the protection scope of the present application.

It is to be noted that the terms such as "first", "second", and the like described in the present disclosure are used herein only for the purpose of description and are not intended to indicate or imply relative importance, or implicitly indicate the number of the indicated technical features. Therefore, features defined by "first" and "second" may explicitly or implicitly include at least one of the features. Furthermore, the technical solutions between the various examples may be combined with each other, but must be on the basis that the combination thereof can be implemented by a person of ordinary skill in the art. In case of a contradiction with the combination of the technical solutions or a failure to implement the combination, it should be considered that the combination of the technical solutions does not exist, and is not within the protection scope of the present application.

Then, all the directional indications, such as upper, lower, left, right, front, back, etc., in the examples of the present application are merely used to explain a relative position relationship, motion situations, and the like of the components in a specific gesture (as shown in the figures). If the specific gesture changes, the directivity indication also changes accordingly. The direction herein may be direct connection, and may also be indirect connection.

Although the present disclosure has been described with reference to the preferred examples, various improvements can be made and components therein can be replaced with equivalents without departing from the scope of the present disclosure. In particular, as long as there is no structural conflict, the technical features in the examples can be combined in any way. The present disclosure is not limited to the specific examples disclosed herein, but shall include all technical solutions falling within the scope of the claims.

What is claimed is:

1. An alternating cascaded system for high-salinity wastewater treatment, comprising
   a pollutant removal system and an alternating cascaded water conveyance system embedded in the pollutant removal system, wherein
   the pollutant removal system comprises four partition plates, a hollow cylindrical pollutant removal zone, a cylindrical discharge sump located in an axial center of the hollow cylindrical pollutant removal zone, a rotating shaft fixedly connected to the four partition plates, and a fixed support configured to support the alternating cascaded system;
   the four partition plates are uniformly distributed in the hollow cylindrical pollutant removal zone of the pollutant removal system, to axially and uniformly partition the hollow cylindrical pollutant removal zone into four sector-shaped pollutant removal subzones comprising a first pollutant removal subzone, a second pollutant removal subzone, a third pollutant removal subzone and a fourth pollutant removal subzone;
   a hydrogel material having a purification effect is filled in each of the four sector-shaped pollutant removal subzones;
   the hollow cylindrical pollutant removal zone, the cylindrical discharge sump and the rotating shaft are coaxial to share a common central axis perpendicular to a ground;
   the alternating cascaded water conveyance system comprises a feed water conveyer pipe, a feed valve, feed water distribution channels, a cleaning water pipe, a cleaning water valve, and cleaning water distribution channels, wherein
   the feed valve is connected to the feed water conveyer pipe,
   the feed water distribution channels are disposed on an outer wall of the first pollutant removal subzone and located under the feed water conveyer pipe,
   the cleaning water valve is connected to the cleaning water pipe, and
   the cleaning water distribution channels are disposed on an outer wall of the third pollutant removal subzone and located under the cleaning water pipe;
   the alternating cascaded water conveyance system further comprises a purified water discharge pipe and a cleaning water discharge pipe, wherein
   the purified water discharge pipe and the cleaning water discharge pipe are located in the cylindrical discharge sump and axially have a same discharge direction from top to bottom;
   a discharge pipe partition plate separates the purified water discharge pipe from the cleaning water discharge pipe in the cylindrical discharge sump;
   both the purified water discharge pipe and the cleaning water discharge pipe are tangent to an inner wall of the cylindrical discharge sump; and
   the purified water discharge pipe is axially provided with a row of purified water discharge holes sequentially arranged and facing outward, and the cleaning water discharge pipe is axially provided with a row of cleaning water discharge holes sequentially arranged and facing outward, wherein
   the row of purified water discharge holes face the first pollutant removal subzone, and the row of cleaning water discharge holes face the third pollutant removal subzone.

2. The alternating cascaded system according to claim 1, wherein
   the feed water distribution channels are disposed layer by layer, and
   the feed water distribution channels comprise a first-stage feed water distribution channel, a second-stage feed water distribution channel, a third-stage feed water distribution channel and a fourth-stage feed water distribution channel, wherein
   the first-stage feed water distribution channel, the second-stage feed water distribution channel, the third-stage feed water distribution channel and the fourth-stage feed water distribution channel are sequentially disposed layer by layer from top to bottom, and a feed water distribution hole is provided at a junction between each of the feed water distribution channels and the alternating cascaded system.

3. The alternating cascaded system according to claim 1, wherein
   the cleaning water distribution channels are disposed layer by layer, and
   the cleaning water distribution channels comprise a first-stage cleaning water distribution channel, a second-stage cleaning water distribution channel, a third-stage cleaning water distribution channel and a fourth-stage cleaning water distribution channel, wherein
   the first-stage cleaning water distribution channel, the second-stage cleaning water distribution channel, the third-stage cleaning water distribution channel and the fourth-stage cleaning water distribution channel are sequentially disposed layer by layer from top to bottom, and a cleaning water distribution hole is provided at a junction between each of the cleaning water distribution channels and the alternating cascaded water conveyance system.

4. The alternating cascaded system according to claim 1, wherein
   the cylindrical discharge sump has a diameter of 110-280 mm;
   the cylindrical discharge sump comprises a housing and at least one row of water distribution holes, wherein
   the at least one row of water distribution holes are sequentially arranged on a surface of the housing, face two sides of the housing vertically in an axial direction, and face the first pollutant removal subzone;
   circle centers of the purified water discharge holes and circle centers of the at least one row of water distribution holes of the cylindrical discharge sump are in a one-to-one correspondence in the first pollutant removal subzone;

a filter screen is provided on a contact surface between each of the four sector-shaped pollutant removal subzones and the cylindrical discharge sump, and a hole diameter of the filter screen is 25-55% of a diameter of each of the at least one row of water distribution holes of the cylindrical discharge sump.

5. The alternating cascaded system according to claim 4, wherein four rows of water distribution holes are axially and sequentially arranged on the surface of the housing of the cylindrical discharge sump, and the four rows of water distribution holes are circumferentially and uniformly distributed along cross sections of the cylindrical discharge sump.

6. The alternating cascaded system according to claim 1, wherein a diameter of each of the holes in the row of purified water discharge holes is 110-115% of a diameter of a corresponding water distribution hole of the cylindrical discharge sump; and the diameter of each of the holes in the row of purified water discharge holes is 3-8 mm.

7. The alternating cascaded system according to claim 1, wherein a feed check valve is disposed on the feed water conveyer pipe;

a diameter of the feed water conveyer pipe is 20-45% of a diameter of the cylindrical discharge sump;

purified water discharge baffles are disposed on the purified water discharge pipe; and the purified water discharge baffles are distributed on a wall of the purified water discharge pipe, and water flowing out from the hollow cylindrical pollutant removal zone enters the purified water discharge pipe and does not flow into the cylindrical discharge sump.

8. The alternating cascaded system according to claim 1, wherein a cleaning water check valve for controlling whether the cleaning water pipe feeds water is disposed on the cleaning water pipe, and a diameter of the cleaning water pipe is equal to a diameter of the feed water conveyer pipe.

9. The alternating cascaded system according to claim 1, wherein cleaning water discharge baffles are disposed on the cleaning water discharge pipe; and the cleaning water discharge baffles are distributed on a wall of the cleaning water discharge pipe, and water flowing out from the hollow cylindrical pollutant removal zone enters the cleaning water discharge pipe and does not flow into the cylindrical discharge sump.

10. The alternating cascaded system according to claim 1, wherein a hydrogel filler in each of the four sector-shaped pollutant removal subzones has a thickness of 500-1,000 mm, and the hydrogel material has a filling rate of 70-85%;

the four partition plates and the cylindrical discharge sump are welded and treated to be waterproof;

each of the four partition plates is made of a stainless steel material; and a housing of the cylindrical discharge sump is cylindrical, has a diameter of 180-2,000 mm, and is made of stainless steel.

\* \* \* \* \*